US008039116B2

(12) United States Patent
Bewlay et al.

(10) Patent No.: US 8,039,116 B2
(45) Date of Patent: Oct. 18, 2011

(54) NB-SI BASED ALLOYS HAVING AN AL-CONTAINING COATING, ARTICLES, AND PROCESSES

(75) Inventors: Bernard Patrick Bewlay, Schenectady, NY (US); Ramgopal Darolia, West Chester, OH (US); Voramon Supatarawanich Dheeradhada, Latham, NY (US); Richard DiDomizio, Scotia, NY (US); Michael Francis Xavier Gigliotti, Scotia, NY (US); Joseph David Rigney, Milford, OH (US); Pazhayannur Ramanathan Subramanian, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 918 days.

(21) Appl. No.: 11/835,672

(22) Filed: Aug. 8, 2007

(65) Prior Publication Data
US 2009/0042054 A1 Feb. 12, 2009

(51) Int. Cl.
B32B 15/01 (2006.01)
C22C 27/02 (2006.01)

(52) U.S. Cl. ........ 428/632; 428/472; 428/641; 428/651; 428/660; 428/662

(58) Field of Classification Search .................. None
See application file for complete search history.

(56) References Cited

U.S. PATENT DOCUMENTS

| | | | | |
|---|---|---|---|---|
| 2,822,268 A * | 2/1958 | Hix | ............................. | 420/426 |
| 4,956,144 A * | 9/1990 | Jackson et al. | ................ | 420/580 |
| 4,983,358 A * | 1/1991 | Hebsur et al. | ................ | 420/425 |
| 4,990,308 A * | 2/1991 | Jackson | ........................ | 420/426 |
| 5,006,307 A * | 4/1991 | Jackson | ........................ | 420/426 |
| 5,296,309 A * | 3/1994 | Benz et al. | ..................... | 428/614 |
| 5,316,865 A * | 5/1994 | Benz et al. | ..................... | 428/614 |
| 5,366,565 A * | 11/1994 | Jackson | ........................ | 148/426 |
| 5,741,376 A | 4/1998 | Subramanian et al. | | |
| 5,833,773 A | 11/1998 | Bewlay et al. | | |
| 5,932,033 A | 8/1999 | Jackson et al. | | |
| 5,942,055 A | 8/1999 | Jackson et al. | | |
| 6,409,848 B1 | 6/2002 | Bewlay et al. | | |
| 6,419,765 B1 | 7/2002 | Jackson et al. | | |
| 6,428,910 B1 | 8/2002 | Jackson et al. | | |
| 6,447,623 B1 | 9/2002 | Jackson et al. | | |
| 6,521,356 B2 * | 2/2003 | Zhao et al. | .................... | 428/632 |
| 6,645,560 B2 * | 11/2003 | Zhao et al. | ................. | 427/376.1 |
| 6,676,381 B2 | 1/2004 | Subramanian et al. | | |
| 6,913,655 B2 * | 7/2005 | Jackson et al. | ................ | 148/422 |
| 7,296,616 B2 * | 11/2007 | Bewlay et al. | ................ | 164/519 |

(Continued)

OTHER PUBLICATIONS

M.P. Brady et al.; "Oxidation resistance and mechanical properties of Laves phase reinforced Cr in-situ composites"; Intermetallics, (2000), vol. 8, No. 9, pp. 1111-1118.

(Continued)

*Primary Examiner* — Aaron Austin
(74) *Attorney, Agent, or Firm* — GE Global Patent Operation; Peter T. DiMauro

(57) ABSTRACT

Nb—Si based alloy articles comprising a Nb—Si based alloy upon which is disposed an environmentally-resistant coating are described. They include a coating comprising at least one phase selected from the group consisting of $M(Al,Si)_3$, $M_5(Al,Si)_3$, and $M_3Si_5Al_2$, wherein M is one or more of Nb, Ti, Hf, Cr. Such coating can improve the environmental (e.g., in oxidation-promoting environments) resistance of a Nb—Si based alloy and alloy articles. Methods for preparing these articles are described as well.

18 Claims, 2 Drawing Sheets

U.S. PATENT DOCUMENTS 7,704,335 B2 * 4/2010 Bewlay et al. ................ 148/422

OTHER PUBLICATIONS

M.P. Brady et al; "High-Temperature Oxidation and Corrosion of Intermetallics"; from Materials Sci. & Techn. (2000); vol. II; Chap. 6, pp. 279-284. Wiley-VCH: Weinheim DE.

J. Doychak & M.G. Hebsur; "Protective Al2O3 Scale Formation on NbAl3-Base Alloys"; Oxidation of Metals (1991) vol. 36, Nos. 1/2; pp. 113-141.

M.B. Hebsur et al.; "Influence of Alloying Elements on the Oxidation Behavior of NbAl3"; Oxidation of High-Temperature Intermetallics (1989); pp. 171-183, Warrendale, PA.

S.Priceman et al.; "Fused Slurry Silicide Coatings for the Elevated Temperature Oxidation of Columbium Alloys", Met. Soc. Conf. (1967), vol. 41, pp. 959-982.

S. Priceman et al.; "Reliable, Practical, Protective Coatings for Refractory Metals Formed . . . Fusion of Silicon Alloy Slurries", Electrochemical Techn., (1968), vol. 6, p. 315.

* cited by examiner

NB-SI BASED ALLOYS HAVING AN AL-CONTAINING COATING, ARTICLES, AND PROCESSES

BACKGROUND

The present invention generally relates to coatings for niobium (Nb)-silicide (Si) based solid solution alloys and Nb—Si based composite compositions. In particular, the invention relates to coatings for Nb—Si based solid solution alloy and Nb—Si based composite compositions having properties that permit the Nb—Si based solid solution alloy and Nb—Si based composite compositions to find applications in turbine components.

Turbines (and their components) such as, but not limited to, aeronautical turbines, land-based, turbines, marine-based turbines, and the like, have typically been formed from superalloys, often based on Ni. Turbine components formed from these Ni-based superalloys exhibit desirable chemical and physical properties under the high temperature, high stress, and high-pressure conditions generally encountered during turbine operation. For example, turbine components, such as an airfoil, in modern jet engines can reach temperatures as high as about 1050° C., which can be as high as approximately 85% of the melting temperatures ($T_m$) of many Ni-based superalloys.

However, efforts have been made to develop alternative turbine component materials. These alternate materials include Nb-based refractory metal intermetallic composites (hereinafter "RMIC"s). Most RMICs have melting temperatures of about 1700° C. If RMICs can be used at about 80% of their melting temperatures, they will have potential use in applications in which the temperature exceeds the current service limit of Ni-based superalloys.

Examples of such RMIC's include various Nb—Si based in-situ composites. Niobium-silicon in-situ composites possess a useful range of mechanical properties, such as low-temperature toughness as well as reasonable high-temperature strength and creep resistance. However, an impediment to the development of the Nb—Si in-situ composites for high-temperature applications in aircraft engines is that their environmental resistance, e.g., oxidation behavior, is not always completely satisfactory. While further alloying with Ti, Al, Hf, Cr, and other elements has produced material systems with improved environmental resistance, further improvement in oxidation behavior is desirable for application in hot-section engine components such as airfoils, rotors, nozzles, shrouds, and exhaust components. Coating systems under development may provide environmental benefits; however, a suitable coating system has not yet been developed to meet the demanding requirements imposed by an engine environment.

BRIEF SUMMARY OF THE INVENTION

One embodiment of the present disclosure is directed to a Nb—Si based alloy article comprising a Nb—Si based alloy and an environmentally-resistant coating disposed thereupon, said coating comprising at least one phase selected from the group consisting of $M(Al,Si)_3$, $M_5(Al,Si)_3$, and $M_3Si_5Al_2$; wherein M is selected from the group consisting of Nb, Ti, Hf, Cr, and combinations of the foregoing. As used herein, "Nb—Si based alloy" is broadly intended to refer to a material which includes at least one Nb-containing phase having Si. Such a material can have a microstructure which includes at least a Nb—Si alloy; and/or, a niobium silicide intermetallic phase. The Nb—Si based alloy can, in certain embodiments, be a niobium-based refractory intermetallic composite.

Another embodiment of the present disclosure relates to a method of making a Nb—Si based alloy article comprising a Nb—Si based alloy and an environmentally-resistant coating disposed thereupon, said method comprising:
(a) depositing an Al-containing composition on said Nb—Si based alloy by a method selected from vapor phase deposition, plasma spray-based deposition, slurry-based deposition, and combinations thereof; and
(b) heat treating the Nb—Si based alloy having an Al-containing composition deposited thereupon at a temperature of about 500° C. to about 1550° C. to yield a coating disposed on said alloy, said coating comprising at least one phase selected from the group consisting of $M(Al,Si)_3$, $M_5(Al,Si)_3$, and $M_3Si_5Al_2$, wherein M is selected from the group consisting of Nb, Ti, Hf, Cr, and combinations of the foregoing.

Yet another embodiment of the present disclosure relates to a method of making Nb—Si based alloy article comprising Nb—Si based alloy and an environmentally-resistant coating disposed thereupon, said method comprising:
(a) forming an overlay composition comprising at least one phase selected from the group consisting of $M(Al,Si)_3$, $M_5(Al,Si)_3$, and $M_3Si_5Al_2$, wherein M is selected from the group consisting of Nb, Ti, Hf, Cr, and combinations of the foregoing;
(b) depositing said overlay composition upon a surface of Nb—Si based alloy to form Nb—Si based alloy bearing said overlay composition upon a surface thereof;
(c) heat treating said Nb—Si based alloy bearing said overlay composition under conditions effective to yield an environmentally-resistant coating disposed on said alloy, said coating comprising said at least one phase.

Other features and advantages of this invention will be better appreciated from the following detailed description.

DETAILED DESCRIPTION OF THE EMBODIMENTS

Figure 1:
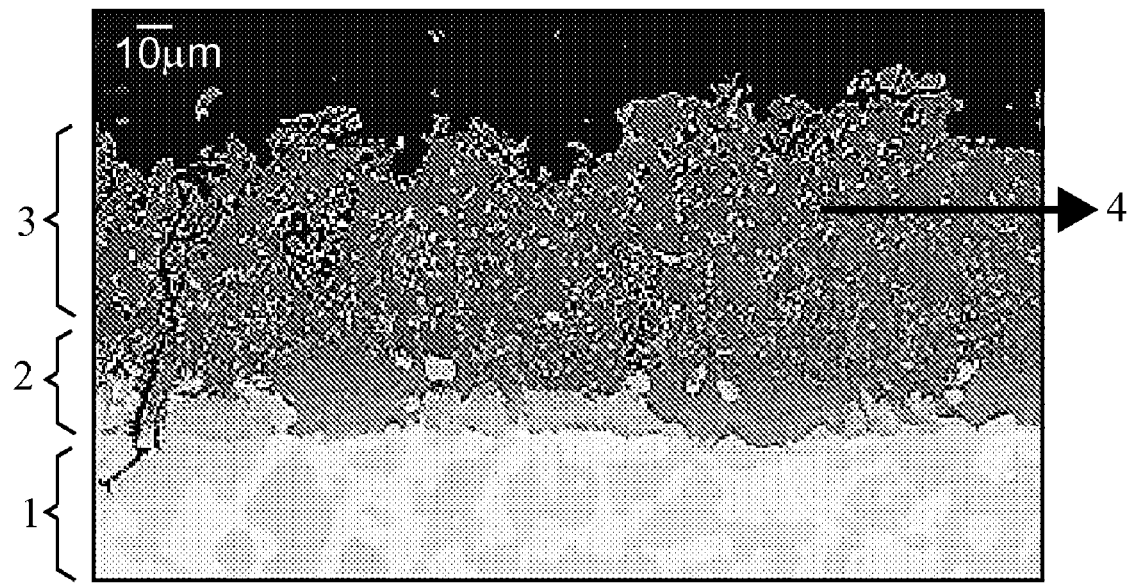
FIG. 1 is a sectional illustration of an article comprising a coating according to illustrative embodiments of the invention.

The articles described herein are formed from Nb—Si based alloys, many of which are generally known in the art. Many suitable examples are described in the following patents, which are all incorporated herein by reference: U.S. Pat. Nos. 5,833,773 (Bewlay et al); U.S. Pat. No. 5,932,033 (Jackson et al); U.S. Pat. No. 6,409,848 (Bewlay et al); U.S. Pat. No. 6,419,765 (Jackson et al); and U.S. Pat. No. 6,676,381 (Subramanian et al). The Nb—Si based alloys can have a microstructure comprising a metallic Nb-base phase and an intermetallic metal silicide phase (e.g., Nb-silicide). However, they may include one or more other phases as well. (As used herein, "alloy" is meant to describe a solid or liquid mixture of two or more metals, or one or more metals with one or more non-metallic elements).

In addition to niobium and silicon, the alloys usually include at least one element selected from the group consisting of titanium (Ti), hafnium (Hf), chromium (Cr), and aluminum (Al). Ti and/or Hf are often preferred constituents. A typical range for Ti is about 2 atom % to about 30 atom % (based on total atom % for the alloy material), and preferably, about 12 atom % to about 25 atom %. A typical range for Hf is about 0.5 atom % to about 12 atom %, and preferably, about 2 atom % to about 8 atom %. A typical range for Cr is about 0.1 atom % to about 25 atom %, and preferably, about 2 atom % to about 20 atom %. A typical range for Al is about 0.1 atom % to about 15 atom %, and preferably, about 0.1 atom % to about 4 atom %. The alloys frequently include other elements as well. Non-limiting examples are molybdenum, yttrium, tantalum, rhenium, ruthenium, zirconium, iron, tungsten, germanium, tin, carbon, and nitrogen. The particular inclusion and amount for any of these elements will of course depend on a variety of factors, such as the desired properties for the final alloy product.

The Nb—Si based alloys can be formed into useful articles by a variety of forming techniques. Casting is typically employed. Various details regarding the casting of these refractory materials are well-known in the art. Non-limiting examples of casting techniques are described by Subramanian et al, in U.S. Pat. No. 6,676,381 (incorporated herein by reference).

The Nb—Si based alloy articles of embodiments of the present disclosure include an environmentally-resistant coating disposed on a surface of the article, which coating comprises at least one phase selected from the group consisting of $M(Al,Si)_3$, $M_5(Al,Si)_3$, and $M_3Si_5Al_2$; wherein M is selected from the group consisting of Nb, Ti, Hf, Cr, and combinations of the foregoing. The presence of these phases can result in significant improvements in some of the important characteristics of the article. As used herein, the term "coating" includes any surface region of an article which contains one or more of the aforementioned phases. The thickness or size of the coating will depend in part on the type of article in use. As an example, the coating for an article with relatively thin walls, e.g., a turbine airfoil, may be thinner than the coating of an article which has a greater thickness.

As a non-limiting illustration in the case of a gas turbine blade, the "coating" broadly is considered to extend to a thickness of about 5 to about 250 microns (preferably about 5 to about 75 microns), and usually extends to a thickness of about 50 microns into the surface, and preferably, no greater than about 25 microns into the surface. In the case of articles with greater cross-sectional thicknesses, the coating could extend to a thickness of about 250 microns. It should be understood that "coating" refers to a surface region of the bulk alloy itself, treated according to method embodiments of the present disclosure. In other words, the "coating" does not refer to oxidation layers which are formed on top of the bulk alloy, during one or more of the thermal treatments described below.

As previously mentioned, the coating comprises at least one phase selected from the group consisting of $M(Al,Si)_3$, $M_5(Al,Si)_3$, and $M_3Si_5Al_2$; wherein M is selected from the group consisting of Nb, Ti, Hf, Cr, and combinations of the foregoing. The types of phases present will depend on a variety of factors, such as the elements present in the alloy substrate; the respective proportions of those elements; and the heating and processing conditions which are used to incorporate aluminum into the region (discussed below). Non-limiting examples of phases which may be within the coating include aluminides (including $NbAl_3$, $NbAl_2$, $NbAl_3Ti$), silicides (including $MSi_2$, $M_5Si_3$, $MSi$, $M_3Si$, where M is a one or more of Nb, Ti, Cr, Al, Mo, W, Fe, Ta, Hf, etc., as well as Nb—Ti—Si, $CrSi_2$, $Cr_5Si_3$, CrSi, and $Cr_3Si$, etc.). The phases which are preferred are those which confer oxidation resistance in a range of aggressive environments.

In an embodiment of the present disclosure, Nb—Si based alloy articles include a coating which comprises at least two phases selected from the group consisting of $M(Al,Si)_3$, $M_5(Al,Si)_3$, and $M_3Si_5Al_2$. In another embodiment, Nb—Si based alloy articles include a coating which comprises the phases $M(Al,Si)_3$, $M_5(Al,Si)_3$, and $M_3Si_5Al_2$. In another embodiment, Nb—Si based alloy articles include a coating which comprises $M(Al,Si)_3$ phase in an amount of up to a volume fraction of about 90% (more preferably a volume fraction of about 40% to about 90%), $M_5(Al,Si)_3$ phase in an amount of up to a volume fraction of about 50% (more preferably a volume fraction of about 1% to about 50%), and $M_3Si_5Al_2$ phase in an amount of up to a volume fraction of about 30% (more preferably a volume fraction of about 1% to about 30%), based on volume of the coating.

In embodiments, the $M(Al,Si)_3$ phase, if present in the coating, has a nominal composition, in atomic percent, of about 55-78% Al, 0-10% Si, 1-30% Nb, 1-30% Ti, with a total atomic content of Nb and Ti of about 15-40%.

In embodiments, the $M_5(Al,Si)_3$ phase, if present in the coating, has a nominal composition, in atomic percent, of about 0-15% Al, 1-12% Hf, 1-8% Cr, 25-45% Si, 1-65% Nb, 1-65% Ti, with a total atomic content of Nb and Ti of about 30-70%.

In embodiments, the $M_3Si_5Al_2$ phase, if present in the coating, has a nominal composition, in atomic percent, of about 15-25% Al, 1-12% Hf, 1-8% Cr, 40-60% Si, 25-45% Nb, 25-45% Ti, with a total atomic content of Nb and Ti of about 20-40%.

The coating formed according to embodiments of the present disclosure can involve a single layer or multiple layers. These layers can have a range of architectures, from flat planar layers to corrugated layers of a range of geometries. The methods of forming a coating according to embodiments of the present disclosure preferably involve interdiffusion of deposited material with the base Nb—Si substrate, for some specific phase formation and improvements.

Preferably, the phases formed in coatings according to embodiments of the disclosure can promote the formation of an oxide layer. In more preferred embodiments, such an oxide layer is a highly adherent protective continuous oxide scale upon Nb—Si based alloys. For surface enrichments with an Al-containing composition, such continuous oxide scale can comprise oxides such as alumina and other oxides containing metals such as Al and Ti, among others. In preferred embodiments, the oxide scale comprises alumina.

The Nb—Si based alloy articles according to the present disclosure, which include an environmentally-resistant coating disposed thereupon, are typically made by a method comprising depositing an Al-containing composition on a Nb—Si based alloy by an aluminizing method (such as a method selected from vapor phase deposition, plasma spray-based deposition, slurry-based deposition, and combinations thereof); and thereafter, heat treating the Nb—Si based alloy having an Al-containing composition deposited thereupon, typically at a temperature of about 500° C. to about 1550° C., to yield a coating disposed on said alloy.

In embodiments, an Al-containing composition is deposited by a vapor phase aluminizing method selected from the group consisting of physical vapor deposition, chemical vapor deposition, halide assisted pack cementation, above the pack (ATP), ion plasma deposition, and sputtering. In other embodiments, plasma-spray deposition methods, including but not limited to air plasma spraying (APS), vacuum plasma spraying (VPS), low pressure plasma spraying (LPPS), high velocity oxy-fuel (HVOF) and high velocity air-fuel (HVAF), are used to apply an Al-containing composition to the substrate surface. In still other embodiments, an Al-containing composition is deposited by slurry aluminizing. In preferred embodiments, such slurry aluminizing comprises the steps of forming a slurry of metal particles, which are partly or wholly Al metal, in a liquid vehicle preferably including a binder, and applying said slurry to said Nb—Si alloy by slip-casting, brush-painting, dipping, spraying, pouring, rolling, spin-coating, or combinations of the foregoing. As used herein, the term "an Al-containing composition" means a composition which is partly or wholly Al metal.

An example of such slurry-based approaches comprises the following steps. Firstly, a slurry is formed, comprising either an aqueous or organic base, and containing a metal oxide (e.g., $SiO_2$, $Al_2O_3$) binder, such as hydrolyzed alkoxysilane compounds (e.g., TEOS) or the silicon dioxide binders disclosed in the description of US Patent Publication 2005/0031781, herein incorporated by reference in its entirety. The $SiO_2$ binder is preferably added as a colloidal suspension in either water or the organic being used, and various thickeners (e.g., glycerol, etc.) and suspension aids can be added as necessary. The slurry can contain various other ingredients as well. Many of these are known in the art to those involved in slurry preparations. Slurries are generally described in "Kirk-Othmer's Encyclopedia of Chemical Technology", 3rd Edition, Vol. 15, p. 257 (1981), and in the 4th Edition, Vol. 5, pp. 615-617 (1993), as well as in U.S. Pat. Nos. 5,759,932 and 5,043,378. Each of these references is incorporated herein by reference. Metal powder (e.g., spherical, crushed, flake, etc.) comprising aluminum is added to the liquid component of the slurry and applied to the metal substrate.

Secondly, the slurry can be applied to the surface by many different techniques. For example, it can be slip-cast, brush-painted, dipped, sprayed, poured, rolled, or spun-coated onto the substrate surface. Spray-coating is often the easiest way to apply the slurry coating to substrates which have complex geometric shapes, such as turbine airfoils. The viscosity of the coating can be readily adjusted for spraying, by varying the amount of liquid carrier used. Spraying equipment is well-known in the art. Any spray gun should be suitable, including manual or automated spray gun models; air-spray and gravity-fed models, and the like. Adjustment in various spray gun settings (e.g., for pressure and slurry volume) can readily be made to satisfy the needs of a specific slurry-spraying operation. The slurry can be applied as one layer, or multiple layers.

Following the deposition of an Al-containing composition, a curing step may be performed, to drive off any organic species or other undesired materials which may be present in the as-deposited region having an Al-containing composition. Subsequently, a heat treatment can be used to effect interdiffusion and phase formation/stabilization. The aluminum can be driven into the substrate over a wide range of temperatures, covering both solid-state and liquid diffusion processes. Without being limited by any theory, this process of driving an Al-containing composition into the Nb—Si based alloy substrate can be termed "interdiffusion". The practical limits of this are about 500° C. as a lower limit (slow solid state interdiffusion), and, as an upper limit, at the incipient melting point of the alloy, which can range from about 1300° C. to about 1550° C. in the class of Nb—Si based alloys. The time duration of the heat treatment can range from about 10 min to about 10 hrs, more preferably about 60 min to about 120 min.

However, within this wide range of practical temperatures in which Al can be driven into the substrate, there are two temperature regions which can have different characters with respect to the initial oxide that is formed after oxidation. If the Al is interdiffused above about 1000° C., it is observed that an amount of $TiO_2$ (rutile) is formed at the surface after oxidation (to be described below), which is less preferred as a surface oxide. Without being bound by theory, it is believed that this is due to a growth in size of a $Ti_5Si_3$ phase in the coating. This would allow $TiO_2$ (rutile) to be the initial oxide formed upon exposure to an oxidizing environment. However, if the Al is interdiffused below about 1000° C., it is observed that the primary oxide formed after oxidation is $Al_2O_3$. Long exposures result in the continued formation of $Al_2O_3$ without the formation of $TiO_2$. Thus, the initial heat treatment is an integral part of obtaining the desired oxide species over the exposure life of the part. Without being bound by theory, it is believed that the preferential formation of the $Al_2O_3$ is due to the presence of a $NbAl_3$ phase in the coating. Therefore, it is preferred to conduct the heat treatment at a temperature of from about 600° C. to about 1000° C., even more preferably about 870° C. to about 1000° C. Regardless of the temperature of interdiffusion, however, a substantially continuous oxide scale can be achieved after oxidation of an interdiffused article.

The heat treatment which is performed after an Al-containing composition is deposited can be carried by using various types of equipment. It is most preferred that this heat treatment is conducted under conditions to promote interdiffusion. Such conditions include heat treatment in the substantial absence of agents which promote oxidation, such as in a substantial vacuum or an inert atmosphere. However, the complete absence of agents (e.g. oxygen) which promote oxidation is not always required, and in some embodiments oxygen can be present.

According to embodiments a second heat treatment, (i.e., prior to entrance into service of coated articles), in the presence of an oxidizing agent (e.g., air, $O_2$, $CO_2$, steam, etc.) may be carried out. This embodiment results in the formation of one or more oxide layers over the coating. The oxide layer can be referred to as an oxide "scale". It can also be formed, at least in part, when the heat treatment conducted under conditions to promote interdiffusion further contains at least some oxidizing agent. Such oxide scale may also be formed, at least in part, when articles which are aluminized are put into service in hot environments which promote formation of such scale. The oxide scale may contain different phases, depending in part on the content of the bulk alloy, along with the particular heat treatment conditions employed. The thickness of the oxide layer will depend in part on the other factors described herein (especially heat treatment time and temperature; and bulk alloy composition), and is usually of a thickness of up to about 20 microns.

As previously mentioned, oxide scale according to embodiments is a highly adherent protective continuous oxide scale upon Nb—Si based alloys, and can comprise oxides such as alumina and other oxides containing metals such as Al and Ti, among others, although alumina is preferred. Nb—Si based alloys are aluminized so as to promote the application of Nb—Si based alloys for structural applications in oxidative environments. The use of appropriate surface modification techniques according to embodiments of the disclosure enables oxidation-protection of internal surfaces such as passageways and cooling holes.

An alternative method of making an Nb—Si based alloy article having an environmentally-resistant coating, is via an overlay method. In this method, an overlay composition is first formed. The overlay composition comprises at least one phase selected from the group consisting of $M(Al,Si)_3$, $M_5(Al,Si)_3$, and $M_3Si_5Al_2$, wherein M is selected from the group consisting of Nb, Ti, Hf, Cr, and combinations of the foregoing. This overlay composition, containing the desired phase(s) already pre-formed, is then deposited upon a surface of an Nb—Si based alloy, by a method such as physical vapor deposition (PVD), ion plasma deposition (IPD), air plasma spraying (APS), vacuum plasma spraying (VPS), low pressure plasma spray (LPPS), high velocity oxy-fuel (HVOF), high velocity air-fuel (HVAF), and the like. Heat treating of the Nb—Si based alloy bearing the overlay composition can then be performed, under conditions effective to yield an environmentally-resistant coating having at least one of the aforementioned phases disposed on the alloy. This post-deposition heat treatment may be carried out in the temperature range of 1200° C. to 1500° C. to form a small interdiffusion zone to chemically bind the coating to the substrate and to homogenize the deposited coating.

An advantage of this overlay method is that significant interdiffusion with the Nb—Si substrate is not required to form the preferred phases, as would be true when an aluminum-containing composition is deposited on a Nb—Si substrate surface. Rather, the preferred phases imparting environmental resistance are directly deposited on the surface. The pre-formed phases are generally made by melting or otherwise alloying a composition comprising a source of M (wherein M is selected from the group consisting of Nb, Ti, Hf, Cr, and combinations of the foregoing), with a source of Al and/or a source of Si, wherein the atomic content of M, Al and/or Si are each sufficient to provide the phase $M(Al,Si)_3$, $M_5(Al,Si)_3$, or $M_3Si_5Al_2$, as desired. For instance, to form a $NbAl_3$ phase, a source of Nb and a source of Al may be provided in a substantially stoichiometric ratio and then melted or otherwise alloyed, although a substantially stoichiometric ratio is not always required. Each "source" of M, Al, and/or Si preferably is zerovalent, elemental, or in metallic or alloy form, although using compounds of one or more of M, Al, and/or Si is also within the scope of the present disclosure, provided that the each is sufficiently reduced so as to form the required phase. Methods of melting or otherwise alloying metals and/or metalloids are generally known in the field, and can include melting the desired composition as a bulk ingot and either machining the resultant ingot into a target or creating powder (depending on the chosen use of the pre-formed phases for deposition).

Preferable kinds of articles prepared and treated according to aspects of the disclosure include Nb—Si based alloy articles for airfoil and other structural applications in a turbine combustion environment. The turbine component can be a component selected from the group consisting of a bucket, a blade, a rotor, a shroud, an exhaust component, and a nozzle. The turbine component can be in a turbine selected from the group consisting of land-based turbines, marine turbines, aeronautical turbines, and power generation turbines.

One of the requirements of a high-temperature material, such as turbine components composed of surface-modified alloys made according to the present disclosure, is that it should resist attack by gases at high temperatures and, in particular, that it should resist oxidation. This is because turbine components may often oxidize in service, and can react with combustion products. Excessive attack of this sort is undesirable in such a highly stressed component. Therefore, the oxide scale of the present disclosure can protect turbine components, and act as a barrier to reduce the rate at which the underlying metal of the component reacts with oxygen. Rates of oxidation can be measured, in practice, by specific weight increase ($\Delta m$) as a function of time (t), owing to the fact that oxidation proceeds by the addition of oxygen atoms to the surface of a material. It is preferable that articles according to the present disclosure exhibit parabolic oxidation behavior; however, the invention is not limited to such behavior. Such behavior is explained as follows.

Two types of oxidation behavior are usually observed at high temperature. The first is linear oxidation, shown by the following equation:

$$\Delta m = k_L t$$

where $\Delta m$ is the specific weight increase, t is time, and $k_L$ is a kinetic constant. The second type of oxidation behavior is parabolic oxidation, shown by the equation:

$$(\Delta m)^2 = k_p t$$

with where $k_p$ is another kinetic constant, always positive. Linear weight gain is explained by the fact that, as an oxide film thickens, it develops cracks, or partly lifts away from the material, so that the barrier between material and oxide does not become any more effective as oxidation proceeds. If the volume of the oxide is much less than that of the material from which it is formed, it will crack to relieve the strain (oxide films are usually brittle). If the volume of the oxide is much greater, on the other hand, the oxide will tend to release the strain energy by breaking the adhesion between material and oxide, and springing away. Better protection, then, can be offered by a system which exhibits protective parabolic growth of oxide, wherein the specific weight at first increases owing to oxide formation, followed by a decrease in the rate at which specific weight increases. The decrease in oxidation rate with time, characteristic of an adherent scale, results from the fact that oxygen present in the environment must now diffuse through already-formed oxide scale to interact with the metal and cause more oxide to form. The rate of oxygen diffusion through the oxide is much slower than the rate of oxygen diffusion into the metal, thus the reduction in oxide formation and specific weight increase. Without being limited by any mechanism or theory, it is believed that coatings of the present disclosure can provide protective parabolic growth of oxide.

In addition to functioning as or fostering an oxygen-barrier layer, the oxide layer can function as a bond layer for an overlying protective barrier, e.g., a ceramic overcoat. One example of such an overlying barrier is a thermal barrier coating (TBC). TBC's are often formed from materials like zirconia, stabilized zirconia (e.g., yttria-stabilized), zircon, mullite, and combinations thereof, as well as other refractory materials having similar properties. These coatings are well-known in the art and described, for example, in a patent issued to Zhao et al, U.S. Pat. No. 6,521,356, which is incorporated herein by reference. A second example of an overlying barrier is an environmental barrier coating (EBC). EBC's are formed from oxides such as barium strontium alumino silicate (BSAS), mullite, and similar oxides having good resistance to high temperature water vapor environments. These coatings are well known in the art and described, for example, in a patent issued to Eaton et al, U.S. Pat. No. 6,284,325.

TBC's and EBC's can be applied by many conventional techniques, such as physical vapor deposition and air plasma spray. The thickness of the TBC and EBC layers can vary greatly, depending on many factors. Usually, the overlying barrier has a thickness in the range of about 10 microns to about 600 microns. In other embodiments, a separate, protective coating can be applied over the article having the coating according to the present disclosure. This protective coating could serve as the sole overlying barrier (i.e., the top layer of the article, providing further oxidation resistance), or it could function as a bond coat for a TBC or EBC. In those instances in which an oxide scale is present over the coatings made according to embodiments of the present disclosure, it may sometimes be desirable to remove the scale before application of this protective coating.

FIG. 1 is a sectional illustration of the microstructure of a coated Nb—Si based alloy according to embodiments of the present disclosure. The bulk Nb—Si based alloy 1 which has been treated with an Al-containing slurry and fired at 870° C. for 1 hr bears coating 3 disposed thereupon with an intervening interdiffusion zone 2. The dark coating matrix 4 within coating 3 has a generally tetragonal structure as shown by electron backscatter diffraction (EBSD), which structure is consistent with $M(Al,Si)_3$ phases. Electron Probe Micro-Analysis (EPMA) indicates that M is Nb and/or Ti.

Figure 2:
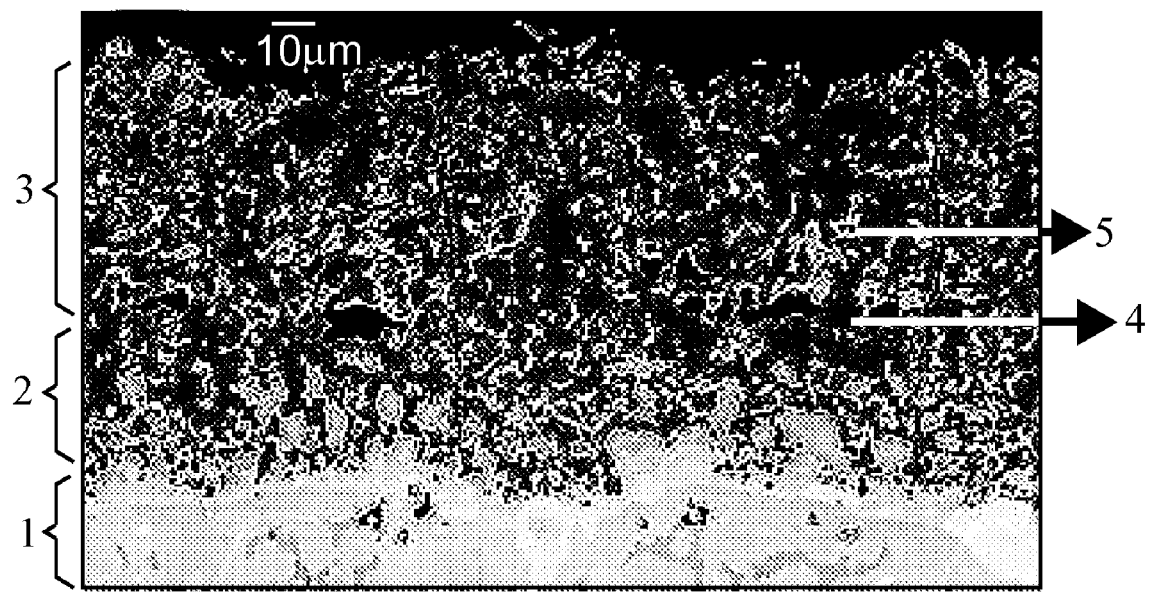
FIG. 2 is a sectional illustration of the microstructure of another coated Nb—Si based alloy according to embodiments of the present disclosure.

FIG. 2 is a sectional illustration of the microstructure of another coated Nb—Si based alloy according to embodiments of the present disclosure. The bulk Nb—Si based alloy 1 which has been treated with an Al-containing slurry and fired at 870° C. for 1 hr and then at 1150° C. for 6 hr bears coating 3 disposed thereupon with an intervening interdiffusion zone 2. Dark coating matrix 4 is as in FIG. 1 above. Light coating precipitate 5 has a generally hexagonal structure by EBSD, which is consistent with $M_5(Al,Si)_3$ phases, as confirmed by EPMA.

Figure 3:
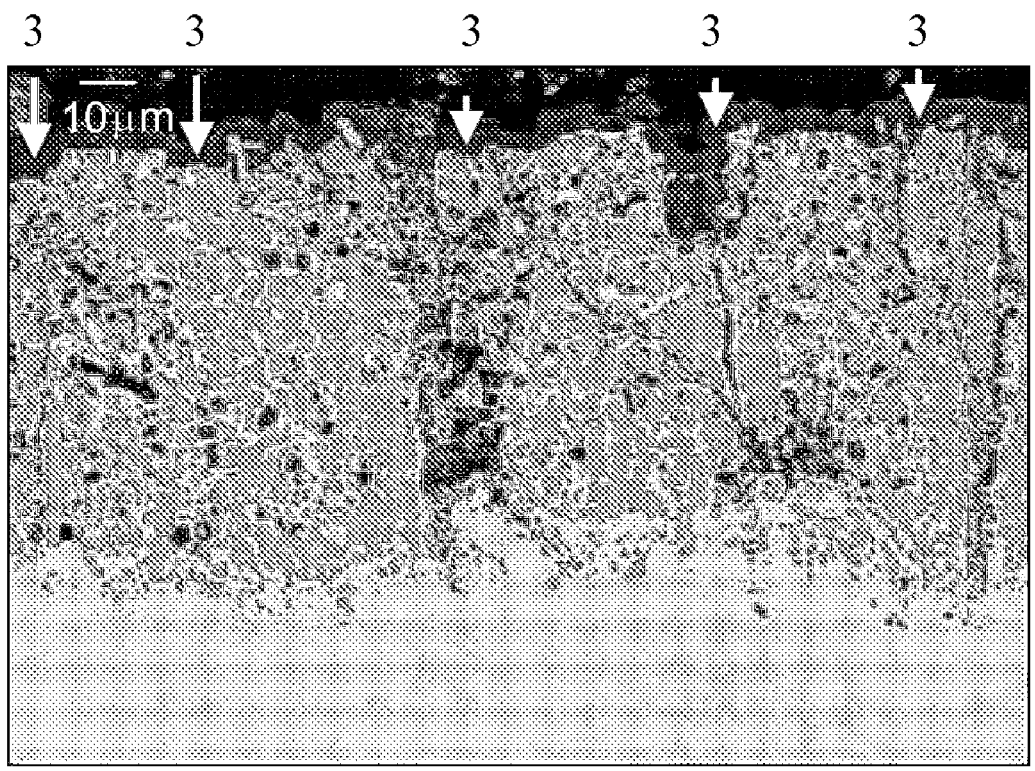
FIG. 3 a sectional illustration of the microstructure of an oxide-scale bearing, coated Nb—Si based alloy according to embodiments of the present disclosure.

FIG. 3 a sectional illustration of the microstructure of yet another coated Nb—Si based alloy according to embodiments of the present disclosure. Here, bulk Nb—Si based alloy has been treated with an Al-containing slurry and fired at 870° C. for 1 hr, and then exposed to an oxygen-containing atmosphere for 100 hr at 1150° C. A continuous, dense oxide scale 6 is clearly formed.

EXAMPLES

The examples that follow are merely illustrative, and should not be construed to be any sort of limitation on the scope of the claimed invention.

Example 1

This example pertains to a coating process using a slurry composition to aluminize a Nb alloy coupon. The slurry binder was a Remasol RTM grade LP-30 colloidal silica having a concentration of 30% $SiO_2$ in water, with a particle size of 12-13 nanometers. Aluminum powder, having an average particle size of 10 microns, was obtained from Alfa Aesar. Finally, the slurry in this example incorporated glycerol (glycerine) as an organic stabilizer to ensure slurry stability.

The overall composition of the slurry was as follows: 32 weight percent of the LP-30 colloidal silica, 60 weight percent of the aluminum powder, and eight weight percent of the glycerol. In this particular example, the actual ingredients were as follows: 32 g LP-30, 60 g aluminum powder, and 8 g glycerol.

The glycerol was combined with one-half of the LP-30 (i.e., 16 weight percent) and mixed for about five minutes. The aluminum powder was then added to the mixture, followed by additional mixing. Mixing was continued until a uniform paste was formed. The remaining portion of the LP-30 was then added, followed by rigorous stirring. The material was mixed immediately prior to use to minimize any settling that occurred.

In this example, the slurry was air-sprayed onto the surface of a pre-treated, Nb-based alloy coupon using a conventional DeVilbiss spray gun. The average thickness (wet) was between 50 and 75 microns. The applied slurry is allowed to air dry and a second coating is applied bringing the total thickness to between 100 and 150 microns.

Following air-drying a second time, the slurry was then cured in an oven, according to this heating regimen: 5° C./min ramp rate to 200° C. and hold at temperature for 60 minutes followed by a 5° C./min ramp rate to room temperature. The coating was then diffusion heat-treated in a vacuum oven at a temperature of 870° C. for 60 minutes while maintaining the above heating and cooling rates. There was no evidence of coating spallation following the completion of this heat-treatment, although there was a non-interdiffused friable layer present on the surfaces of the coated coupon. This friable layer is removed with a glass bead blast.

Example 2

The coated coupon prepared according to Example 1 above was treated to form an oxide scale thereupon. The oxide scale was formed after being exposed to ambient air at a temperature of 1150° C. Following 100 hours of exposure at this temperature, a continuous 3-5 micron scale composed mainly of $Al_2O_3$ had formed at the surface of the aluminum-enriched region.

Various embodiments of this invention have been described in rather full detail. However, it should be understood that such detail need not be strictly adhered to, and that various changes and modifications may suggest themselves to one skilled in the art, all falling within the scope of the invention as defined by the appended claims.

What is claimed is:

1. A Nb—Si based alloy article comprising a Nb—Si based alloy and an environmentally-resistant coating disposed thereupon, said coating comprising at least one phase selected from the group consisting of $M(Al,Si)_3$, $M_5(Al,Si)_3$, and $M_3Si_5Al_2$;
   wherein M is selected from the group consisting of Nb, Ti, Hf, Cr, and combinations of the foregoing; and
   wherein said coating is capable of promoting the formation of an aluminum oxide scale on the Nb—Si based alloy after oxidation.

2. The article of claim 1, wherein said coating comprises at least two phases selected from the group consisting of $M(Al,Si)_3$, $M_5(Al,Si)_3$, and $M_3Si_5Al_2$.

3. The article of claim 1, wherein said coating comprises the phases $M(Al,Si)_3$, $M_5(Al,Si)_3$, and $M_3Si_5Al_2$.

4. The article of claim 3, wherein $M(Al,Si)_3$ phase is present in an amount of a volume fraction of about 40% to about 90%, $M_5(Al,Si)_3$ phase is present in an amount of a volume fraction of about 1% to about 50%, and $M_3Si_5Al_2$ phase is present in an amount of a volume fraction of about 1% to about 30%, based on volume of the coating.

5. The article of claim 4, wherein $M(Al,Si)_3$ phase is present in an amount of a volume fraction of about 60% to about 80%, $M_5(Al,Si)_3$ phase is present in an amount of a volume fraction of about 20% to about 40%, and $M_3Si_5Al_2$ phase is present in an amount of a volume fraction of about 1% to about 5%, based on volume of the coating.

6. The article of claim 3, wherein the $M(Al,Si)_3$ phase has a nominal composition, in atomic percent, of about 55-78% Al, 0-10% Si, 1-30% Nb, 1-30% Ti, with a total atomic content of Nb and Ti of about 15-40%; and the $M_5(Al,Si)_3$ phase has a nominal composition, in atomic percent, of about 0-15% Al, 1-12% Hf, 1-8% Cr, 25-45% Si, 1-65% Nb, 1-65% Ti, with a total atomic content of Nb and Ti of about 30-70%; and the $M_3Si_5Al_2$ phase has a nominal composition, in atomic percent, of about 15-25% Al, 1-12% Hf, 1-8% Cr, 40-60% Si, 25-45% Nb, 25-45% Ti, with a total atomic content of Nb and Ti of about 20-40%.

7. The article of claim 6, wherein the M(Al,Si)$_3$ phase has a nominal composition, in atomic percent, of about 60-75% Al, 0-8% Si, 10-20% Nb, 5-15% Ti, with a total atomic content of Nb and Ti of about 20-30%; and the M$_5$(Al,Si)$_3$ phase has a nominal composition, in atomic percent, of about 4-9% Al, 2-7% Hf, 3-8% Cr, 30-40% Si, 15-25% Nb, 25-35% Ti, with a total atomic content of Nb and Ti of about 40-55%; and the M$_3$Si$_5$Al$_2$ phase has a nominal composition, in atomic percent, of about 18-22% Al, 2-7% Hf, 3-8% Cr, 45-55% Si, 30-40% Nb, 30-40% Ti, with a total atomic content of Nb and Ti of about 25-35%.

8. The article of claim 1, wherein said coating comprises M(Al,Si)$_3$ phase in an amount of up to a volume fraction of about 90%, M$_5$(Al,Si)$_3$ phase in an amount of up to a volume fraction of about 50%, and M$_3$Si$_5$Al$_2$ phase in an amount of up to a volume fraction of about 30%, based on volume of the coating.

9. The article of claim 1, wherein the Nb—Si based alloy comprises a metallic niobium-base phase and at least one metal silicide phase.

10. The article of claim 9, wherein the Nb—Si based alloy further comprises titanium and at least one element selected from the group consisting of hafnium, chromium, and aluminum.

11. The article of claim 10, wherein the Nb—Si based alloy further comprises at least one element selected from the group consisting of tungsten and tin.

12. The article of claim 1, wherein at least one aluminum oxide layer is disposed over the coating.

13. The article of claim 12, wherein the at least one aluminum oxide layer is formed by a heat treatment which is carried out under conditions effective to form an aluminum oxide over the coating.

14. The article of claim 12, comprising at least one overlying barrier selected from thermal barrier coating or environmental barrier coating, disposed on said oxide layer.

15. The article of claim 1, further comprising at least one overlying barrier selected from thermal barrier coating or environmental barrier coating, disposed directly or indirectly on said environmentally-resistant coating.

16. The article of any of claims 1-13 or 15-14, wherein the article is a turbine component.

17. A Nb—Si based alloy article comprising a Nb—Si based alloy and an environmentally-resistant coating disposed thereupon, said coating comprising at least one phase selected from the group consisting of M(Al,Si)$_3$, M$_5$(Al,Si)$_3$, and M$_3$Si$_5$Al$_2$, wherein M is selected from the group consisting of Nb, Ti, Hf, Cr, and combinations of the foregoing;
wherein the M(Al,Si)$_3$ phase, when present, is in an amount of a volume fraction of about 40% to about 90%,
wherein the M$_5$(Al,Si)$_3$ phase; when present, is in an amount of a volume fraction of about 1% to about 50%, and
wherein the M$_3$Si$_5$Al$_2$ phase, when present, is in an amount of a volume fraction of about 1% to about 30%, percent based on volume of the coating; and
wherein said coating is capable of promoting the formation of an aluminum oxide scale on the Nb—Si based alloy after oxidation.

18. A Nb—Si based alloy article comprising a Nb—Si based alloy and an environmentally-resistant coating disposed thereupon, said coating comprising at least one phase selected from the group consisting of M(Al,Si)$_3$, M$_5$(Al,Si)$_3$, and M$_3$Si$_5$Al$_2$, wherein M is selected from the group consisting of Nb, Ti, Hf, Cr, and combinations of the foregoing;
wherein the M(Al,Si)$_3$ phase, when present, has a nominal composition, in atomic percent, of about 60-75% Al, 0-8% Si, 10-20% Nb, 5-15% Ti, with a total atomic content of Nb and Ti of about 20-30%;
wherein the M$_5$(Al,Si)$_3$ phase, when present, has a nominal composition, in atomic percent, of about 4-9% Al, 2-7% Hf, 3-8% Cr, 30-40% Si, 15-25% Nb, 25-35% Ti, with a total atomic content of Nb and Ti of about 40-55%; and
wherein the M$_3$Si$_5$Al$_2$ phase, when present, has a nominal composition, in atomic percent, of about 18-22% Al, 2-7% Hf, 3-8% Cr, 45-55% Si, 30-40% Nb, 30-40% Ti, with a total atomic content of Nb and Ti of about 25-35%; and
wherein said coating is capable of promoting the formation of an aluminum oxide scale on the Nb—Si based alloy after oxidation.

* * * * *